(12) United States Patent
Anderson, Jr.

(10) Patent No.: US 8,128,318 B1
(45) Date of Patent: Mar. 6, 2012

(54) TIDE CHANGE APPARATUS

(76) Inventor: Clifton Gerard Anderson, Jr., Houston, TX (US)

(*) Notice: Subject to any disclaimer, the term of this patent is extended or adjusted under 35 U.S.C. 154(b) by 258 days.

(21) Appl. No.: 12/366,622

(22) Filed: Feb. 5, 2009

Related U.S. Application Data

(60) Provisional application No. 61/026,389, filed on Feb. 5, 2008.

(51) Int. Cl.
*E02B 9/08* (2006.01)
*F03B 13/14* (2006.01)

(52) U.S. Cl. ............... 405/76; 405/78; 60/498

(58) Field of Classification Search ............ 405/76, 405/78; 60/498
See application file for complete search history.

(56) References Cited

U.S. PATENT DOCUMENTS

| | | | | |
|---|---|---|---|---|
| 4,023,041 A * | 5/1977 | Chappell | ................ | 290/53 |
| 4,984,935 A * | 1/1991 | de Oliveira Filho et al. | . | 405/224 |
| 5,146,798 A * | 9/1992 | Anderson | ................ | 74/87 |
| 6,383,384 B1 * | 5/2002 | Anderson | ................ | 210/321.84 |
| 6,568,878 B2 * | 5/2003 | Woodall et al. | ................ | 405/25 |
| 6,608,393 B2 * | 8/2003 | Anderson | ................ | 290/1 A |
| 2002/0070554 A1 * | 6/2002 | Anderson | ................ | 290/1 R |

* cited by examiner

*Primary Examiner* — Tara Mayo-Pinnock
(74) *Attorney, Agent, or Firm* — Harrison Law Office, P.C.

(57) ABSTRACT

Tide change apparatus and methodology for converting tidal energy into usable mechanical and electrical energy using wedge-hinge assemblies. Electricity is generated by transfer of mechanical energy from both incoming and outgoing tidewaters to an electrical generator. A pair of wedge-hinge assemblies mounted atop semi-submersible barges to enable water to alternately flow into and out of a retention pond relative to a corresponding main body of water in accordance with natural tidal flow.

5 Claims, 6 Drawing Sheets

TIDE CHANGE APPARATUS

RELATED APPLICATIONS

This application claims priority based upon Provisional U.S. Application Ser. No. 61/026,389 filed Feb. 5, 2008.

FIELD OF THE INVENTION

The present invention relates to an apparatus and method for converting tidal energy into usable mechanical and electrical energy using a wedge-hinge apparatus.

BACKGROUND OF THE INVENTION

Modern society is heavily dependent on electricity and each year brings new devices which enable individuals to take digital photographs, listen to digital music, and stay in constant communication without a pen ever touching paper. As new devices and capabilities develop, demand for electricity will continue to grow to unprecedented levels. Already, the need for energy has sparked global conflicts, started a renewable energy movement, and forced energy producers to invest millions of dollars exploring renewable energy generation methods.

The two most common renewable electricity production methods are those utilizing solar and wind power. For hundreds of years, man has used the movement of the wind to move ships and pump water from the ground. Recently, advances in solar cell technology and a renewed interest in renewable energy have resulted in increased private and corporate use of solar cell arrays. Both solar and wind energy technologies have matured to a point where individuals can install and operate self-sufficient electricity generation facilities. However, neither solar or wind power provide reliable, continuous electricity generation. Solar cells only provide electricity during clear sunny days and wind turbines only provide electricity when the wind is blowing. A calm night or overcast day can result in a substantial electrical shortfall for individuals relying solely on solar and wind energy.

The present invention enables transformation of abundant tidal energy into mechanical and electrical energy, thereby providing a reliable, supplemental energy source for domestic energy requirements.

SUMMARY OF THE INVENTION

The present invention provides an apparatus and methodology for transforming naturally occurring tidal energy into mechanical and electrical energy. While naturally occurring tidal forces are referenced herein, it should be clearly understood that the present invention contemplates the instant tide change apparatus as being applicable to any environment where water flows repeatedly from a level of higher potential energy to a level of lower potential energy. Unlike solar and wind energy, tidal energy is nearly constant, relying only on the motion of Earth's moon. Tides occur twice daily everywhere on Earth, each approximately six-hours in duration, but are most evident along coastal regions.

In the preferred embodiment of the present invention, a pair of wedge-hinge devices are mounted atop semi-submersible barges, each barge being located at the tidal entrance of a retention pond thereby blocking water flow into and out of the retention pond. Each wedge-hinge device comprises four wedge-hinge assemblies having curved water blades functioning as remote weights. As the tide moves inland, the barges block the flow of water into the retention pond. One of the wedge-hinge devices mounted atop a barge permits the otherwise obstructed tidewater to flow past a series of water blades and into the retention pond thus turning the wedge-hinge assembly crankshaft, which, in turn, rotates the shaft of an electrical generator. The other wedge-hinge device permits water to flow out of the retention pound as the tide recedes. It will be readily appreciated by those skilled in the art that wear normally manifest on connective chains and sprockets can be minimized by connecting generators/dynamos to each end of the wedge-hinge devices as will be described in detail hereinafter.

These and other objects of the present invention will become apparent from the following specifications and accompanying drawings.

DETAILED DESCRIPTION

Reference is made herein to the figures in the accompanying drawings in which like numerals refer to like components. Now referring to FIGS. 1A, 1B, and 4, there are depicted side and front views of a modified wedge-hinge device 10, described more fully in U.S. Pat. No. 5,146,798 and fully incorporated herein by reference. The original end-weights of each wedge-hinge assembly have been replaced by a plurality of water blades, a single such water blade A connecting two similarly aligned control arms 24 being depicted in FIGS. 1 and 2, comprising a curved surface which generates a downward force upon crank C as water flows past, plunging each water blade in turn deeper into the water. As will be appreciated by those skilled in the art, wedge-hinge assemblies having a 2:1 ratio enable water to flow with half the force which would otherwise be required to turn crankshaft 30. Such reduction in force requirements enables relatively small, but nearly constant water flow to power an electrical generator. Inherent resistance provided by the electrical generator further dampens wedge-hinge assembly motion thereby lowering mechanical wear thereupon. The size and depth of water blade A is determined by the average depth of tidal changes in the coastal region of installation.

Figure 1A:
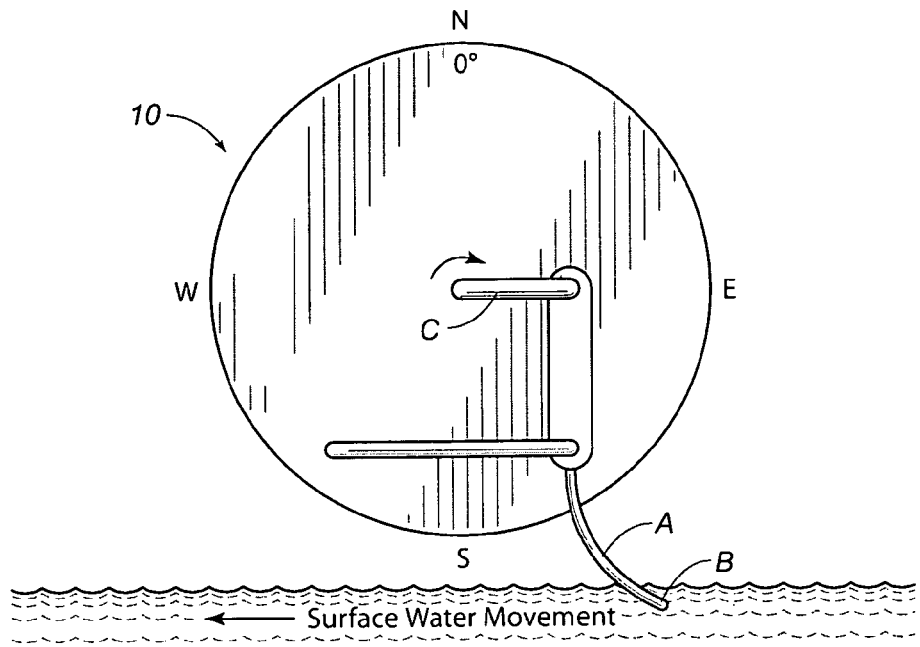
FIG. 1A depicts a simplified side view of a wedge-hinge transmission apparatus, with one of a plurality of wedge-hinge assemblies disposed at the top center of the plates thereof.
Figure 1B:
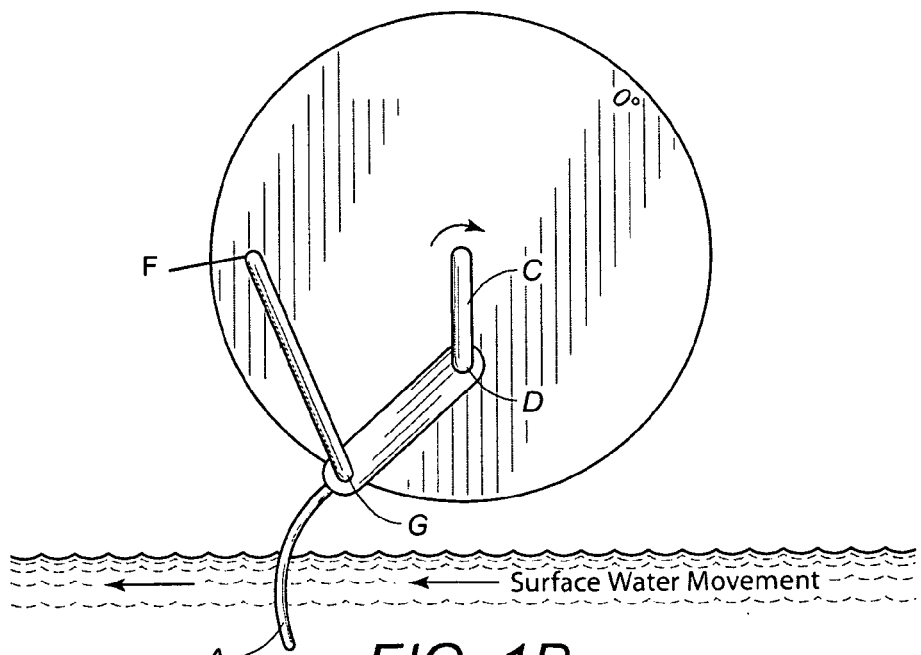
FIG. 1B depicts a simplified side view of a wedge-hinge transmission apparatus, with one of a plurality of wedge-hinge assemblies disposed off-center of the plates thereof.
Figure 4:
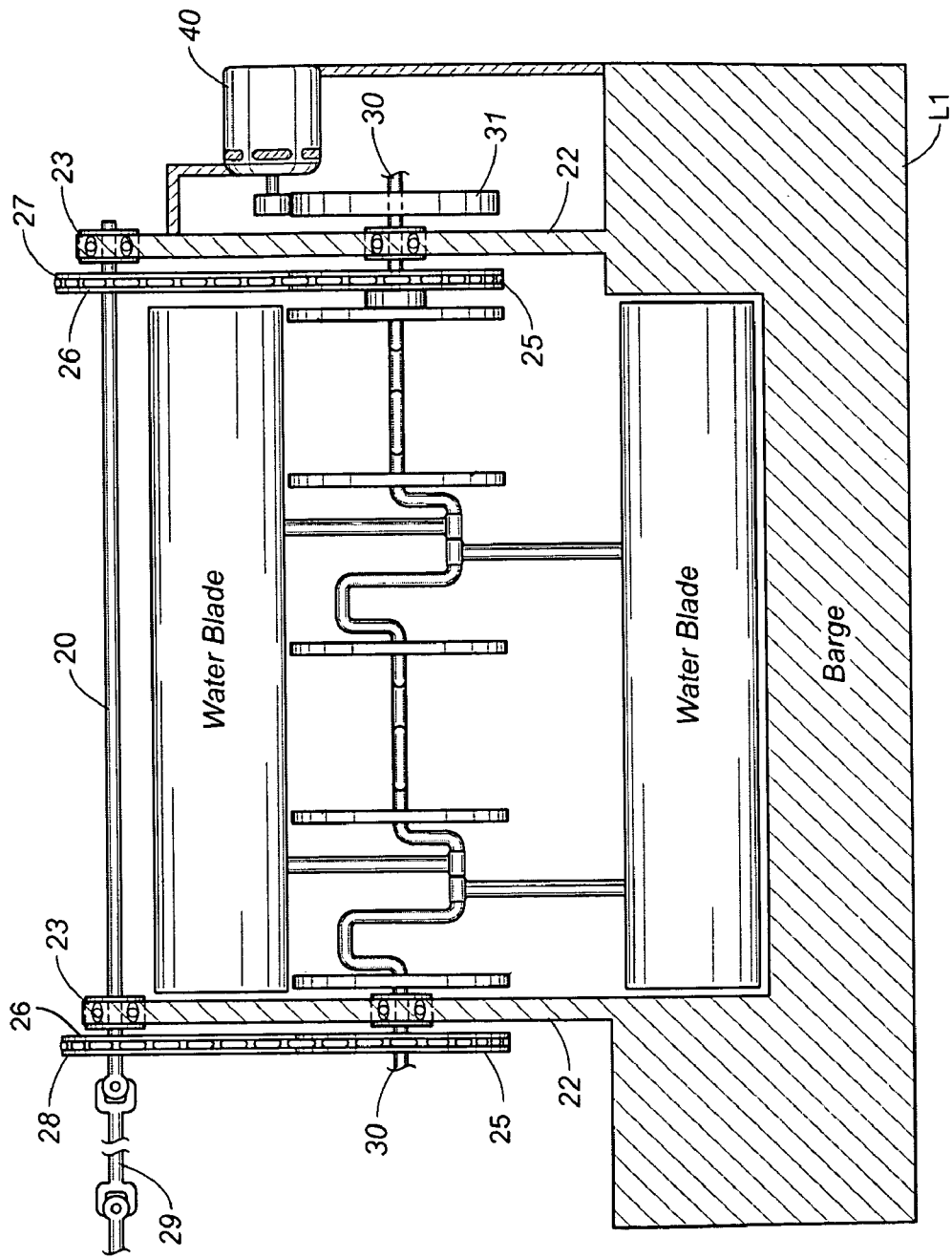
FIG. 4 depicts a simplified front view of wedge-hinge assemblies connected to an electrical generator.
Figure 5:
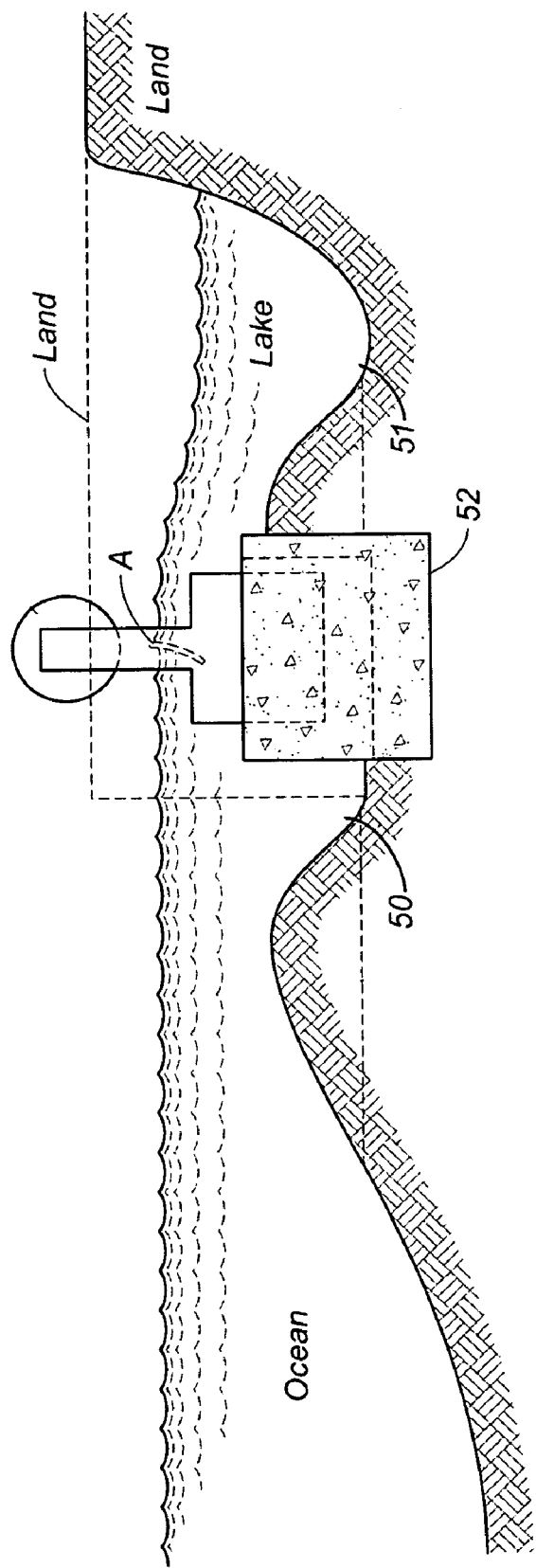
FIG. 5 depicts a simplified side view of a seaside embodiment of the present invention wherein a semi-submersible barge rises as the sea level rises.
Figure 7:
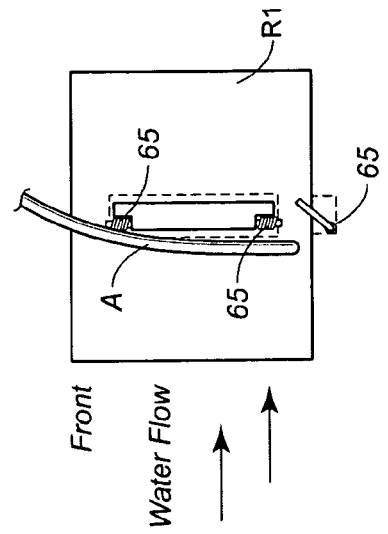
FIG. 7 depicts a side view of the braking system depicted in FIG. 6.
Figure 9:
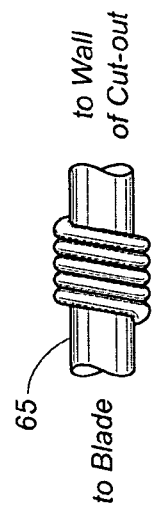
FIG. 9 depicts a close-up view of a singular spring depicted in FIG. 8.
Figure 6:
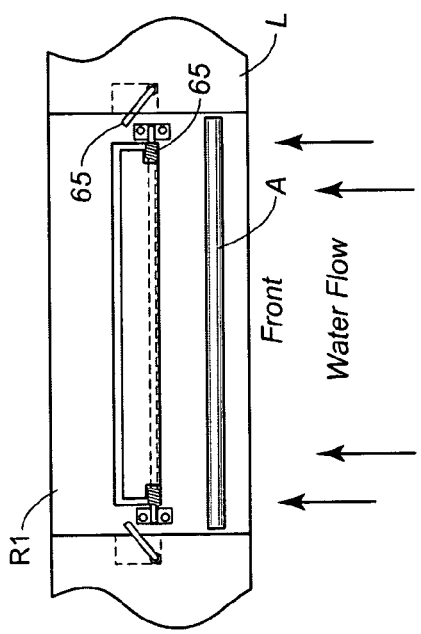
FIG. 6 depicts a simplified top view of the preferred embodiment of the present invention with braking surfaces engaged.
Figure 8:
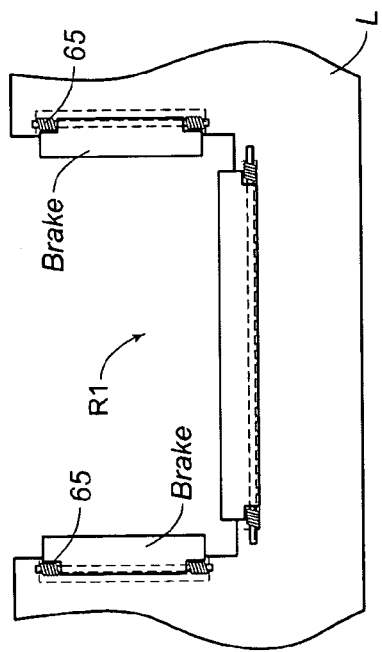
FIG. 8 depicts a front view of the braking system depicted in FIG. 6, wherein the wedge-hinge assemblies have been removed.

Still referring to FIGS. 1A, 1B, and 4, as water flows from east to west, pushing water blade A in the process, crank C is pulled down and connection rod G transfers kinetic energy to plate point F. A controlled timing device (not shown) minimizes energy loss as crank D reverses direction in preparation for additional rotational cycles.

Figure 2:
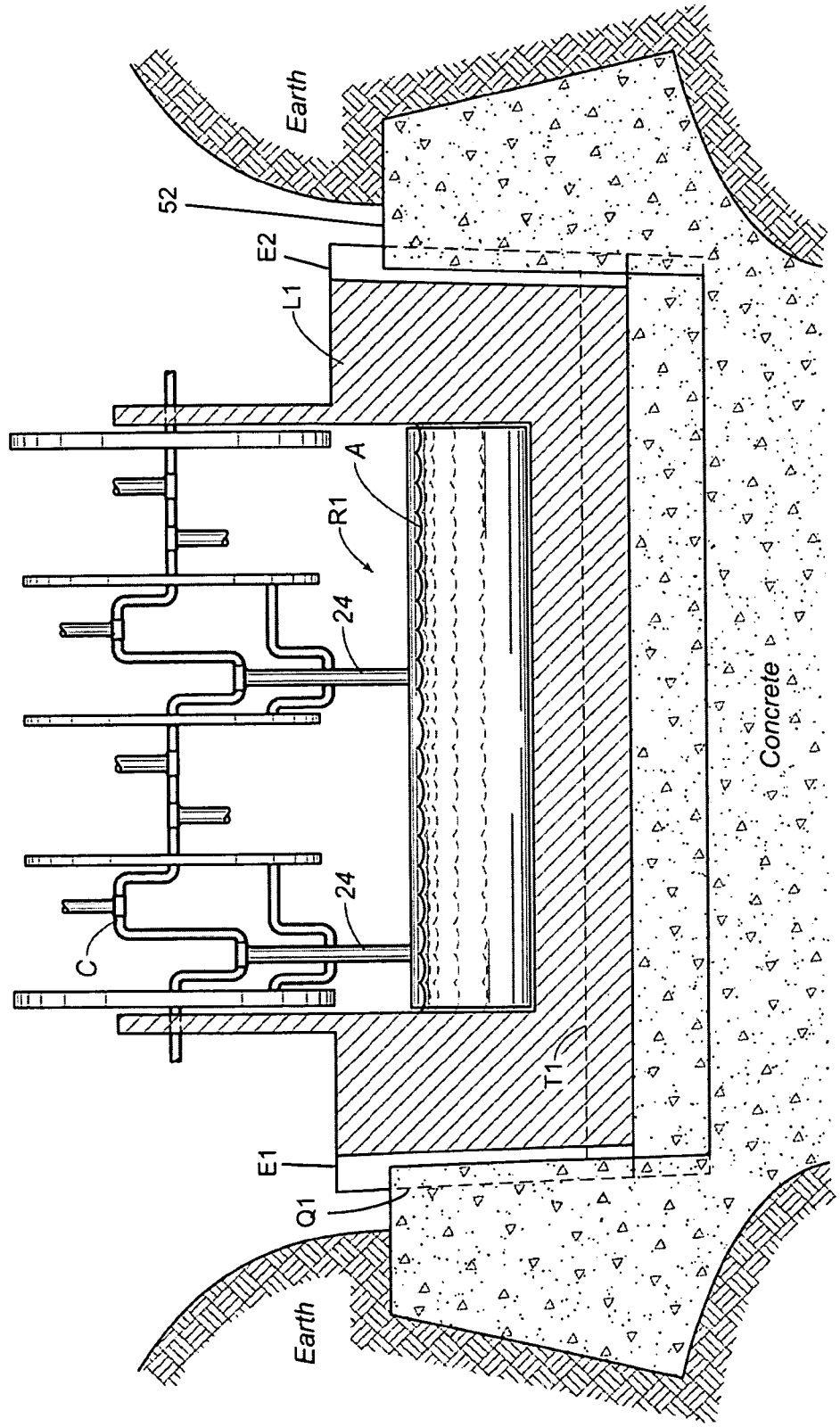
FIG. 2 depicts a simplified front view of a wedge-hinge device mounted atop a semi-submersible barge positioned within a concrete retaining wall.
Figure 3:
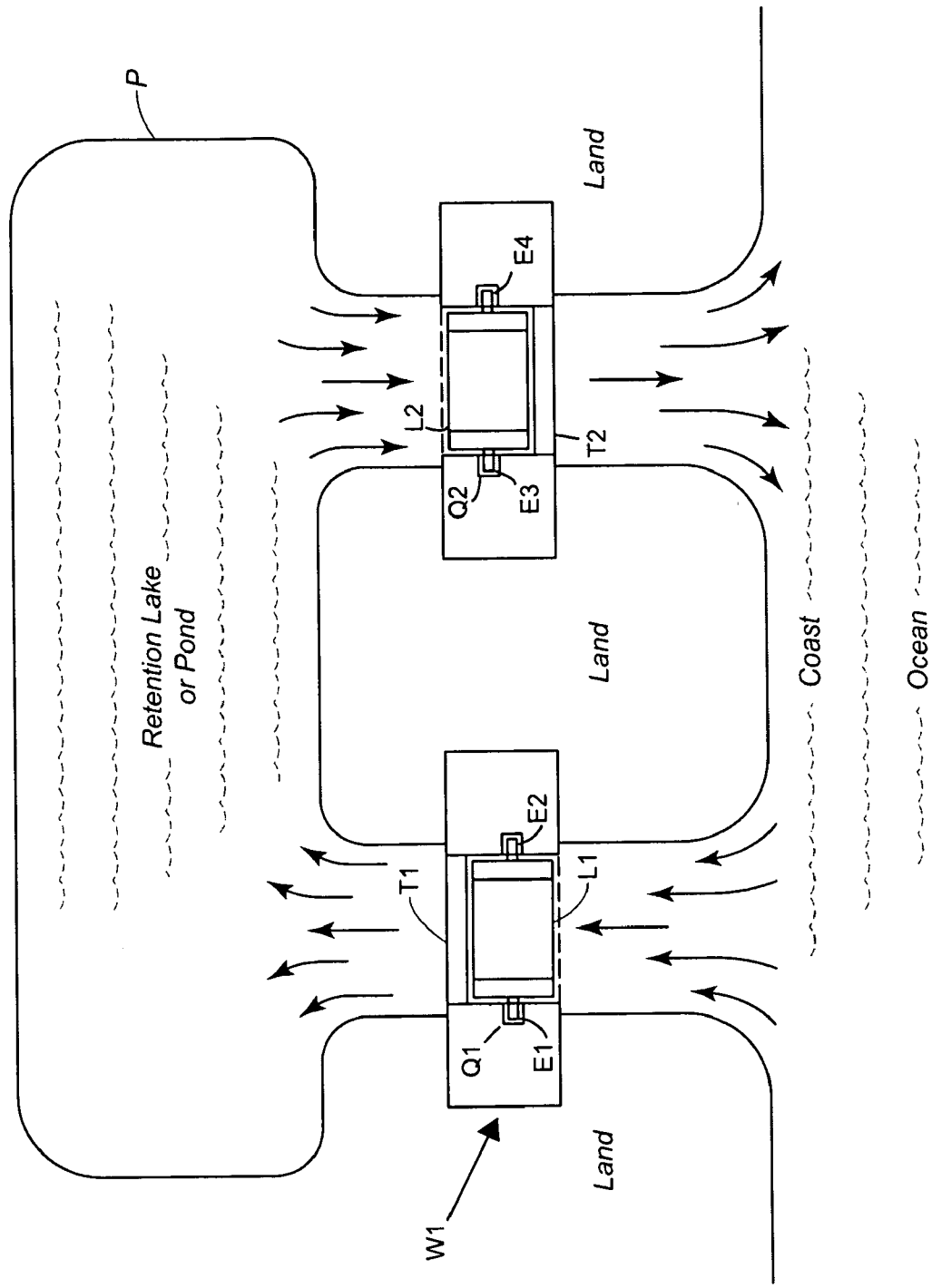
FIG. 3 depicts a simplified top planar view of wedge-hinge assemblies mounted atop a pair of barges which control the flow of water into and out of a retention pond.

Now referring to FIGS. 2 and 3, there is depicted crank C connecting cascading wedge-hinge assemblies, each offset by 90 degrees. As is known to those skilled in the art, an offset crank enables continuous rotation around a central axis as force is applied sequentially to each control arm. Although the preferred embodiment of the present invention is configured with four water blades, wherein each water blade is fixedly connected to a similarly aligned pair of control arms 24, it is further contemplated that each control arm of a wedge-hinge assembly may be equipped with a separate water blade thereby allowing a total of eight water blades per wedge-hinge device 10 which is comprised or four wedge-hinge assemblies.

Still referring to FIGS. 2 and 3, each member of the water blade plurality is fixedly connected to a wedge-hinge assembly by a control arm 24 thereby maximizing surface area exposure to oncoming water which flows over semi-submersed barge L1 through opening R1. The submerged portions of barge L1 function as a dam blocking undesired tidal water flow. Barge L1 rises and falls with the water level present in ocean channel 50. Conversely, barge L2 rises and falls with the water level present in retention pond P. Concrete sealing walls T1 and T2 keep barge L1 and L2, respectively, perpendicularly aligned with oncoming water.

Now referring to FIG. 4, there is depicted an embodiment of the present invention mechanically interconnected with electrical generator 40. Crankshaft 30 is rotatably mounted on a pair of vertical supports 22 by a corresponding pair of ball bearing rings or similarly effective mounting method disposed at opposing ends of crankshaft 30. As water pushes past the water blades, crankshaft 30 rotates thereby rotating output gear 31 and providing input torque to the rotor of electrical generator 40.

Still referring to FIG. 4, a pair of sprockets 25 are fixedly mounted to opposing ends of crankshaft 30 and disposed left of said pair of ball bearings. Chain assemblies 27 and 28 mechanically interconnect sprocket pairs 25 and 26, respectively, with driveshaft 20 which is rotatably supported by bearing ring pair 23 fixedly mounted at the upper ends of vertical support pair 22. As will be appreciated by those skilled in the art, driveshaft 20 may optionally be connected to another instance of the present invention by way of drive shaft extension 29 thereby enabling serially connected embodiment of the present invention thereby increasing the mechanical energy available for rotating output gear 30 and producing additional electricity without requiring additional electrical generators.

Referring to FIGS. 2-9, there is depicted the preferred embodiment of the present invention wherein retention pond P is tidally interconnected with an ocean, gulf, or similarly large body of water. As the tide moves inland, barge L1 is held in place by a pair of locking channels Q1, which are configured to receive barge protrusion members E1 and E2, and concrete sealing wall T1. Preferably, the pressure of incoming water and the presence of a sealing membrane such as concrete sealing wall T1 at the retention pond side of barge L1 prevent water from entering retention pond P except by way of opening R1. As the tide moves outland, barge L2 is held in place by a pair of locking channels Q2, which are configured to receive barge protrusion member E3 and E4, and concrete sealing wall T2. The pressure of outflowing water and the presence of a sealing membrane such as concrete sealing wall T2 at the ocean channel side of barge L2 prevent water from entering ocean channel 50 except by way of opening R2 (not shown). As will be appreciated by those skilled in the art, a minimum hydrostatic pressure is often required to achieve efficient power generation. In the present invention, hydrostatic pressure is achieved by employing a braking mechanism. Still referring to FIGS. 2-9, there is depicted a preferred braking system comprising a pair of corrosive resistant wedges and a plurality of springs 65 mounted on the lateral sides of concrete sealing wall T1 and a singular corrosive resistant wedge and a plurality of springs mounted atop barge L1. The springs having a spring constant such that the wedges fall flat when a hydrostatic force approximating one-foot of water is present. If the requisite hydrostatic force is not achieved, or the wedge-hinge assembly starts to reverse rotation, the aforementioned wedges extend, thereby limiting wedge-hinge assembly movement.

As will be appreciated by those skilled in the art, the preferred braking system creates a one-way flow channel. Barge L1 allows water into retention pond P as the tide rises and barge L2, configured nearly identically to barge L1, is positioned to allow outflowing water to flow into ocean channel 50 thus moving the water blades associated with barge L2. Using the barges in such a fashion allows for smaller retention ponds because only enough water to drive one wedge-hinge device 10 is required at any one time. There is only a brief period of time, when the tide is not rising or falling, that electricity is not being generated by one of the wedge-hinge assemblies.

The following is a tabulation of the components depicted in the drawings:

| Components List | | |
|---|---|---|
| # | Component | Comments |
| A | Water blade | |
| B | Water blade lower edge | |
| C | Crank | |
| D | Crank | |
| E1, E2 | Barge protrusion members (pair) | Barge L1 |
| E3, E4 | Barge protrusion members (pair) | Barge L2 |
| F | Plate point | |
| G | Connection rod | |
| L1 | Barge | Water entering retention pond |
| L2 | Barge | Water leaving retention pond |
| P | Retention pond | |
| Q1 | Locking channels (pair) | |
| Q2 | Locking channels (pair) | |
| R1 | Opening | |
| R2 | Opening (not shown) | |
| T1 | Concrete sealing wall | Water entering retention pond |
| T2 | Concrete sealing wall | Water leaving retention pond |
| 10 | Wedge-hinge device | |
| 22 | Vertical supports (pair) | |
| 23 | Bearing ring (pair) | |
| 24 | Driveshaft | |
| 25 | Sprockets (pair) | |
| 26 | Chain | |
| 27 | Chain assembly | |
| 28 | Chain assembly | |
| 29 | Driveshaft extension | |
| 30 | Crankshaft | |
| 31 | Output gear | |
| 40 | Generator | |

-continued

Components List

| # | Component | Comments |
|---|---|---|
| 50 | Ocean channel | |
| 51 | Pond channel | |
| 52 | Concrete container | |
| 65 | Springs | |

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims herein.

What is claimed is:

1. A tide change apparatus disposed between a main body of water and a retention pond tidally interconnected with said main body of water, said tide change apparatus adapted for use in conjunction with a plurality of electrical generators, for transforming tidal water displacement into electrical energy, said tide change apparatus comprising:
    a plurality of semi-submersible barges disposed in a plurality of retention containers, with each one of said plurality of semi-submersible barges disposed in a corresponding one of said plurality of retention containers;
    each of said retention containers further comprising a base member configured to receive one of said plurality of semi-submersible barges and disposed between said retention pond and said main body of water; a pair of locking channels disposed on opposing longitudinal ends of said base member adapted to receive a corresponding pair of protrusions disposed on opposing longitudinal ends of each of said semi-submersible barges; and a sealing wall member longitudinally disposed along said base member and distal of inflow of said tidal water; and
    a plurality of wedge-hinge assemblies having a longitudinally disposed crankshaft, and configured with a plurality of water blades, longitudinally disposed and rotatably mounted atop said plurality of semi-submersible barges, wherein said water blades are displaced along a curvilinear path manifest by tidal water flow of said main body of water intermittently to said retention pond and from said retention pond to said main body of water.

2. The tide change apparatus recited in claim 1, wherein each of said retention containers further comprises:
    a base member configured to receive one of said plurality of semi-submersible barges and disposed between said retention pond and said main body of water;
    a pair of locking channels disposed on opposing longitudinal ends of said base member adapted to receive a corresponding pair of protrusions disposed on opposing longitudinal ends of each of said semi-submersible barges; and
    a sealing wall member longitudinally disposed along said base member and distal of outflow of said tidal water.

3. The tide change apparatus recited in claim 2, wherein said pair of locking channels substantially restricts horizontal displacement of a corresponding one of said plurality of semi-submersible barges.

4. The tide change apparatus recited in claim 1, wherein each of said plurality of semi-submersible barges further comprises:
    a centrally disposed, fully-submersible portion configured to receive said plurality of wedge-hinge assemblies;
    a pair of vertical supports disposed perpendicular to said fully-submersible portion and further disposed at opposing ends thereof;
    a pair of end portions with each one of said end portion disposed at opposite longitudinal ends of said each of said plurality of semi-submersible barges;
    a pair of protrusion members with each of said protrusion member disposed transverse to the outermost vertical edge of each of said end portions; and
    a plurality of wedge members configured to obstruct said plurality of water blades and centrally disposed upon an uppermost surface of said fully-submersible portion of said semi-submersible barge and pivotally mounted thereupon.

5. The tide change apparatus recited in claim 4, wherein said plurality of wedge members are transverse to said uppermost surface of said fully-submersible portion of said semi-submersible barge when hydrostatic pressure is insufficient to urge parallel displacement thereof.

* * * * *